United States Patent [19]
Fiorentini

[11] 3,905,582
[45] Sept. 16, 1975

[54] FOAMED MATERIAL MOLDING HEAD

[76] Inventor: Carlo Fiorentini, Via Grossi, 10, Saronno (Varese), Italy

[22] Filed: Nov. 23, 1973

[21] Appl. No.: 418,214

[30] Foreign Application Priority Data
Dec. 14, 1972 Italy................................ 32898/72

[52] U.S. Cl. ................ 259/4; 137/607; 137/625.32
[51] Int. Cl............................................... B01f 5/00
[58] Field of Search ........ 259/4; 137/563, 599, 607, 137/625.3, 625.32

[56] References Cited
UNITED STATES PATENTS
3,220,801 11/1965 Rill, Jr. ............................. 259/4 X
3,784,169 1/1974 Böckmann............................. 259/4

Primary Examiner—Harvey C. Hornsby
Assistant Examiner—Alan Cantor
Attorney, Agent, or Firm—Edward F. Connors

[57] ABSTRACT

A head for molding plastic materials, has a mixing and outlet conduit for the mixture components, in which the injection nozzle for the individual components comunicate. A valve allows to bypass the supply conduit for each of the components to the respective injection nozzle, or alternatively to a recycling circuit at a first pressure rate, or to a recycling circuit at a higher pressure rate than that of said first recycling circuit.

6 Claims, 7 Drawing Figures

PATENTED SEP 16 1975 3,905,582

FOAMED MATERIAL MOLDING HEAD

This invention is concerned with improvements in or relating to molding heads normally used with high pressure molding machines for generally providing foamed materials, particularly polyurethane foams.

As well known, the machines for producing polyurethane foams comprise storage tanks for gaseous or liquid components providing by interreaction the desired product, these tanks being connected to one or more mixing and molding heads through associated metering pumps supplying stoichiometrically metered amounts of the components to the operating head.

These heads are serially connected to the several delivery or inlet pipings for the components and are further connected by the return pipings to the storage tanks for recycling of the individual components both during machine start and intermediate stages between one molding operation and another.

This recycling is initially required for thermo-stabilizing the parts comprising the apparatus, since the temperature control in the chemical reactions is highly important, whereby the temperature for the individual components should be accurately kept under control.

Furthermore, in molding operations by high pressure machines, such operations normally being carried out in a very short time interval between 1 and 20 seconds, it is extremely important that the product being mixed in the head is of the same temperature and composition characteristics at any moment of the entire operation. Thus, a disuniformity in temperature or composition would involve faults in the molded piece.

Assuming that the metering and thermo-stabilizing units correctly operate, any disuniformities in composition and temperature during molding operations are respectively due to pressure changes in the forward or incoming line between the metering pump and mixing head, as well as the loss of heat along the line.

When considering the two phenomena separately, it is advisable that, as far as the temperature constancy is concerned, the components are allowed to freely recycle for a sufficiently long time interval within the pipings between the thermo-stabilizing unit and mixing head, so that the temperature distribution becomes stabilized and no longer changes in time. Therefore, a molding operation would always be preceded by a recycling stage of the components through the mixing head, as above stated.

On the other hand, when considering the composition uniformity it would be advisable, prior to providing for the molding operation, that said recycling is carried out under the same pressure conditions as encountered at the molding operation which, as above mentioned, occurs at very high pressures (about 100–200 atm.).

However, a continuous high pressure recycling could not generally be performed in that, owing to the high pressure, a serious overheating of the mixture components would appear with accompanying difficulty in controlling the temperature thereof. Therefore, recycling is generally carried out at a low pressure, that is at a substantially lower pressure than molding pressure, and only for a few instants prior to said molding operation, a high pressure recycling is accomplished to provide the same conditions as when molding.

Normally, high pressure recycling is carried out in machines of the above specified design, by operating on the return piping and, since a plurality of alternately operating heads can be mounted on a same pumping line, the operation and recycling for the several heads must necessarily occur at a pressure rate which is common to all of said heads.

It is the object of the present invention to provide a mixing and molding head enabling the normal low pressure recycling for temperature normalization, but a few instants prior to a molding operation allowing for a high pressure recycling independently of the other heads.

Therefore, according to the invention, each of the heads can be set to a molding and recycling pressure of its own.

Generally, the problem has been solved by providing each head with a restricted conduit for bypassing the usual recycling path for each component in the head to bring the pipings between the metering and supply pumps and the heads to the same pressure conditions as required during the molding steps.

More particularly, a head for mixing and molding foamed materials, as provided from a chemical mixture of components interreacting in stoichiometrically metered amounts for providing said foamed product, comprises a head body having a mixing and outlet conduit for said components; a first and at least a second component injecting nozzle, converging to each other at said mixing conduit; an inlet conduit and a relative outlet conduit for recycling each of the mixture components, and a conduit branched off between each inlet conduit and the relative recycling conduit, which branched off conduit has at, at least, one location thereof a minimal cross-section for the material stream passing therethrough, different than the minimal passage cross-section in said recycling conduit; the head also including valve means operable to connect each of the inlet conduits with the associated injecting nozzle or, respectively, with the recycling outlet conduit associated therewith, as well as for indirectly connecting said inlet and recycling conduits through the branched off conduit for recycling at a first pressure rate and for recycling at a second pressure rate, respectively, this second pressure differing from said first pressure.

The inventive principle, on which the present invention is grounded, along with a particular embodiment for a head, will now be more fully explained with reference to the accompanying drawings, in which.

Figure 1:
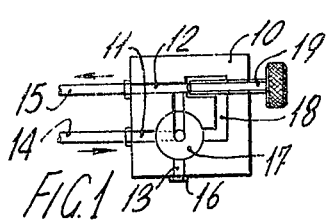
FIG. 1 is a simplified schematic view showing a head preset for a low pressure recycling, to illustrate the principle according to the invention.
Figure 2:
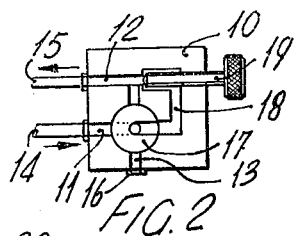
FIG. 2 is a same view for the head shown in FIG. 1, but present for high pressure recycling.
Figure 3:
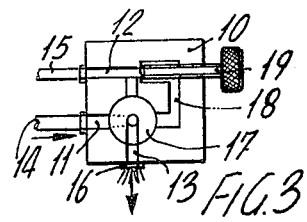
FIG. 3 is still the same view as FIG. 1, but for molding stage.
Figure 4:
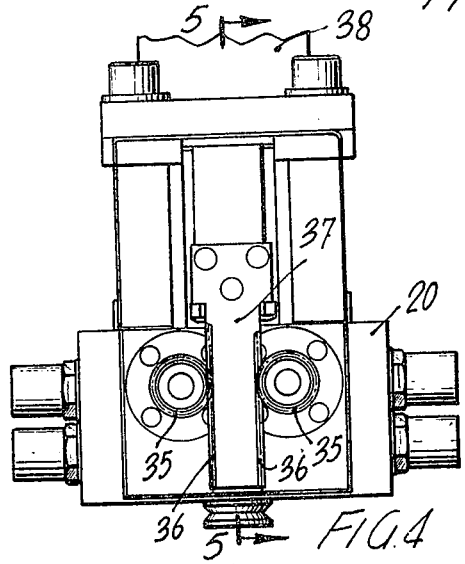
FIG. 4 is a plan view of a practical embodiment for a mixing and molding head embodying the invention.

Referring to FIGS. 1 to 3, the principle will now be described according to which a mixing and molding head of the invention is grounded. In said FIGS. 1 to 3, the head has been schematically shown as connected to the incoming and return pipings for recycling only one component for the purpose of rendering the invention more clearly and readily understood. However, it is apparent that the head, while following the set forth principles, could be suitably modified by taking into account the actual situation occurring in mixing the several components partaking to forming the desired foamed material. This will be better understood from the description of a preferred practical embodiment for a head according to the invention, as shown FIGS. 5 to 7 of the accompanying drawings.

In FIGs. 1, reference numeral 10 diagrammatically designates the head body which is normally provided with a component inlet conduit 11, a second outlet or recycling conduit 12 for the component, as well as a third conduit 13 wherein, in a per se known manner, the several components for molding the foamed material to any desired shape are mixed at a high pressure. The inlet conduit 11 is connected to a proper component supply piping 14 through a suitable pump (not shown) in a storage tank, while the conduit 12 is connected to a piping 15 for recycling the component to said storage tank. Correspondingly, the mixing conduit 13 has at its end a molding nozzle 16 restricting its cross-section passage.

A distribution valve 17, accomodated within a proper seating in the head body 10, connects the inlet conduit 11 with the outlet conduit 12 for recycling at a given pressure rate, as well as connecting the inlet conduit 11 with the mixing conduit 13 for molding the foamed material.

As shown in the drawings and particularly in FIG. 2, a fourth conduit 18 is branched off at a suitable location through the distributing valve 17 to form a bypass passage between the inlet conduit 14 and the recycling conduit 15, so as to cause the recycling to occur at a condition different than the former, that is at a higher pressure rate corresponding to the conditions occurring during molding stage. To this purpose, the minimal passage cross-section for the branched off conduit 18 can be varied by acting upon a suitable needle type of nozzle-control valve 19 inserted in said conduit 18, wherein the control needle position can be axially adjusted or set for varying the restriction, that is to say the annular passage area for the material stream as formed between the needle tip and the facing surface of the conduit, so as to generate the building up of a pressure equal to that generated by the nozzle 16 within the mixing and molding conduit.

FIGS. 1, 2 and 3 of the accompanying drawings illustrate in an orderly array the three subsequent conditions for the head during a molding cycle, and particularly in FIG. 1 there is shown the condition for a low pressure recycling, in FIG. 2 the condition relating to a high pressure recycling normally occuring just shortly before molding, the stage of which is shown in FIG. 3. From these three figures, it will be seen that the distributing valve 17 is to be subsequently rotatably driven to one of its three positions shown to interconnect the several conduits depending on the working steps. In said figures, there is shown an arrangement of the several conduits and the use of a rotary type of distributing valve, it being, however, apparent that for a different arrangement of the conduits, distriburing valves of a different shape could also be used, such as slide valves, without departing from the principle of the present invention.

Referring now to FIGS. 4 to 7, a particular embodiment will be described for a mixing and molding head embodying the improvment according to the invention.

The head, as shown in FIGS; 5 to 7, comprises a body 20 having a first inlet conduit 21 for a component of the mixture to be formed, at least a second inlet conduit 22 for a further component, and corresponding recycling outlet conduits 23 and 24, respectively.

Figure 6:
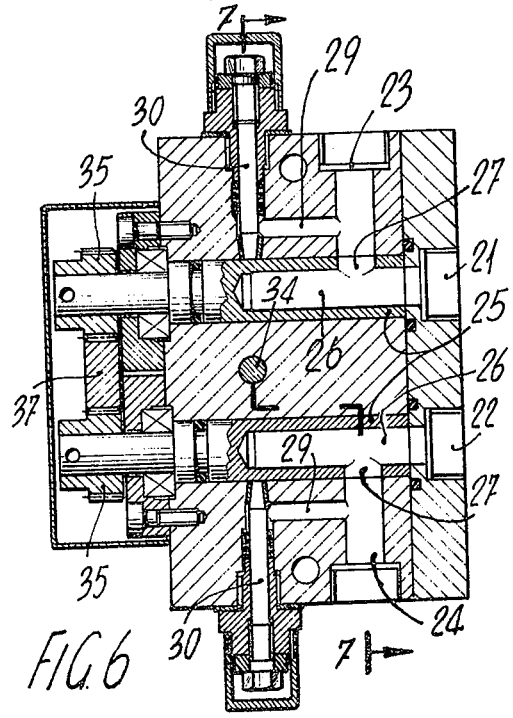
FIG. 6 is a sectional view taken along line 6—6 of FIG. 5.

Conduits 21, 23 and 22, 24, respectively, can be intercomunicated through a respective distributor or rotary valve 25 accomodated within the head body, each of said rotary distributors 25 having an axial dead bottom passage 26 communicating with the inlet conduits 21 and 22, respectively, and, depending on the angular position taken by each distributor, capable of communicating with the respective recycling outlet 23, 24 through a radial passage 27, as well as through a further radial passage 28 with a conduit 29 which, in the sectional view of FIG. 6, is shown as branched off through the distributor 25 between the inlet 21 and relative outlet 23, or between the inlet 22 and relative outlet 24, respectively, as above mentioned. A needle type of nozzle-control valve 30 is inserted in each of the branched off conduits 29 and is for adjusting or varying the restriction, that is the cross-setional area for the flow passage of each component.

Figure 7:
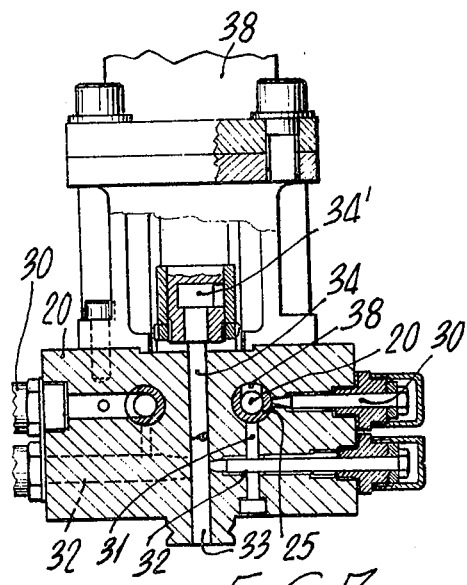
FIG. 7 is a sectional view taken along broken line 7—7 of FIG. 6.

In FIG. 7 of the accompanying drawings it will be also seen that by a suitable rotation said radial passage 28 in the valve or distributor 25 can also comunicate with a conduit 31 in the head body 20, which conduit leads to a nozzle 32 opening in a conduit 33 for component mixing and material outlet to an underlying die or mold.

As schematically shown in FIG. 7, the nozzles 32 for the several components comunicate in the outlet conduit 33 and are arranged coverging to one another, so that the components are directed against one another and high pressure atomized to cause an intimate contact therebetween, so as to initiate the chemical process of forming the foamed material.

In order to maintain the conduit 33 constantly clean of any material residues possibly retained therein, provision is made for using an axially driven pin 34, which is only partially shown in FIG. 7, but which is actually of such a length as to extend to the end of conduit 33 when the head is at the condition shown in FIG. 7, that is preset for low pressure recycling the components.

The rotation of distributors 25 and sliding of pin 34 can be controlled in any manner, for example, as shown in the accompanying drawings, by a rack device operated by any control device. For example, the distributor or valve 25 can extend in a proper seating through the head body 20 projecting on the opposite side, where it carries a gear 35 meshing with a corresponding rack 36 carried by a rod 37 guided to move in a longitudinal direction and connected to the stem of a hydraulic or pneumatic cylinder 38 suitably attached to the head body.

Figure 5:
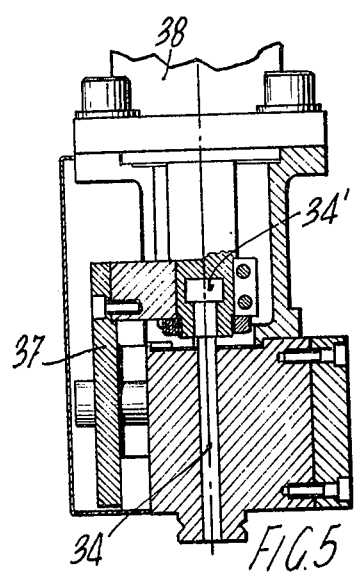
FIG. 5 is a sectional view taken along line 5—5 of FIG. 4.

Correspondingly, the stem of the cylinder 28 is connected to the head 34' of the above mentioned pin. As shown in FIGS. 5 and 7 of the accompanying drawings, a single drive is thus provided for both concurrent rotation of the distributing valves 25 between the three operative positions thereof, and control of the pin 34 for cleaning the pouring conduit or channel 37.

Thus, from the foregoing and as shown in the accompanying drawings, it will be seen that there has been provided a mixing and molding head for foamed material, incorporating means for enabling a high pressure recycling, thereby freeing the operation of each head from that of the other heads serially interconnected to the same delivery and recycling pipings for the components. Therefore, any of the heads can be set to an individual operative condition.

What is claimed is:

1. A mixing and molding head for foamed material, as obtained from a chemical mixture of components interracting in stoichiometrically metered amounts for providing said foamed product, comprising: a head body having a mixing and outlet conduit for the passage of such components to a mold; first and, at least, second component injecting nozzles converging to each other in said mixing conduit; an inlet conduit and a relative recycling outlet conduit for each of the mixture components for the recycling outlet thereof, and a bypass passage branchable off between each inlet conduit and the relative recycling outlet conduit, the latter having at least at one location thereof a minimal cross-section for the passage of the material stream, different from the minimal cross-section of said recycling conduit; said head also including valve means operable for directly connecting each of the inlet conduits with the associated injection nozzle and the recycling conduit associated therewith, respectively, as well as for indirectly connecting said inlet and recycling conduits through said bypass passage for recycling according to a first pressure rate and respectively for recycling according to a second pressure rate different from the first pressure rate.

2. A head as claimed in claim 1, wherein said bypass passage has a restriction, the minimal cross-section for the passage of the material stream being substantially the same as that of said mixing and molding conduit.

3. A head as claimed in claim 1, wherein said valve means comprise rotary distributors each provided with an axial radial passage communicating with first and second radial passages for subsequent connection of an inlet conduit with a recycling conduit and an injection nozzle and with said bypass passage, respectively, said rotary districutors being driven between the operative positions thereof by a common operating device.

4. A head as claimed in claim 3, particularly for mixing at least two components, wherein the rotary distributors are connected to a respective drive gear meshing with rack means and means for operating said rack means.

5. A head as claimed in claim 1, further comprising a nozzle-control valve inserted in each of said bypass passages in order to vary the minimal passage cross-section of the conduit.

6. A head as claimed in claim 3, wherein a pin is provided for sliding along the mixing conduit, said pin being mechanically connected to said operating device for moving along the mixing conduit and maintaining the latter clean and free of impurities.

* * * * *